United States Patent
Langereis et al.

(10) Patent No.: US 8,742,517 B2
(45) Date of Patent: Jun. 3, 2014

(54) COLLAPSED MODE CAPACITIVE SENSOR

(75) Inventors: Geert Langereis, Eindhoven (NL);
Twan Van Lippen, Bladel (NL);
Reinout Woltjer, Eindhoven (NL)

(73) Assignee: NXP, B.V., Eindhoven (NL)

( * ) Notice: Subject to any disclaimer, the term of this patent is extended or adjusted under 35 U.S.C. 154(b) by 100 days.

(21) Appl. No.: 13/379,446

(22) PCT Filed: Jun. 30, 2010

(86) PCT No.: PCT/IB2010/052996
§ 371 (c)(1),
(2), (4) Date: Feb. 17, 2012

(87) PCT Pub. No.: WO2011/001391
PCT Pub. Date: Jan. 6, 2011

(65) Prior Publication Data
US 2012/0133005 A1    May 31, 2012

(30) Foreign Application Priority Data
Jul. 2, 2009    (EP) .................................... 09164441

(51) Int. Cl.
H01L 29/84    (2006.01)

(52) U.S. Cl.
USPC ................... 257/415; 257/416; 257/E29.324; 257/E21.002; 257/E29.111; 438/53

(58) Field of Classification Search
CPC ............ H01H 59/0009; G01P 15/0802; G01P 15/125; B81B 2203/0118; B81B 2201/0235
USPC .................. 257/415–416, E29.324, E21.002, 257/E29.111; 438/53
See application file for complete search history.

(56) References Cited

U.S. PATENT DOCUMENTS

| | | | |
|---|---|---|---|
| 5,186,054 A * | 2/1993 | Sekimura | 73/724 |
| 5,323,513 A * | 6/1994 | Binder et al. | 19/80 R |
| 5,408,731 A | 4/1995 | Berggvist et al. | |
| 5,442,962 A | 8/1995 | Lee | |
| 5,619,476 A | 4/1997 | Haller et al. | |
| 5,870,482 A | 2/1999 | Loeppert et al. | |
| 8,324,006 B1 * | 12/2012 | Adler et al. | 438/50 |
| 2002/0130353 A1 * | 9/2002 | Lieber et al. | 257/315 |
| 2005/0018864 A1 | 1/2005 | Minervini | |
| 2011/0040189 A1 * | 2/2011 | Petruzzello et al. | 600/459 |

FOREIGN PATENT DOCUMENTS

| | | |
|---|---|---|
| CN | 1129980 A | 8/1996 |
| EP | 0 430 676 A2 | 6/1991 |
| EP | 0 596 456 A1 | 5/1994 |
| WO | 2006/031726 A2 | 3/2006 |
| WO | 2009/077961 A2 | 6/2009 |
| WO | 2010/103410 A1 | 9/2010 |
| WO | 2010/113107 A1 | 10/2010 |
| WO | 2010/116324 A1 | 10/2010 |
| WO | 2010/122487 A1 | 10/2010 |

OTHER PUBLICATIONS

"Partition" http://dictionary.reference.com/browse/partition.*

(Continued)

*Primary Examiner* — Jami M Valentine

(57) ABSTRACT

A capacitive sensor is configured for collapsed mode, e.g. for measuring sound or pressure, wherein the moveable element is partitioned into smaller sections. The capacitive sensor provides increased signal to noise ratio.

9 Claims, 2 Drawing Sheets

(56) References Cited

OTHER PUBLICATIONS

Hansen, S. T. et al. "Wideband Micromachined Capacitive Microphones with Radio Frequency Detection", J. Acoust. Soc. Am., vol. 116, No. 2, pp. 828-842 (2004).

Neumann Jr., J. J. et al. "CMOS MEMS Membrane for Audio-Frequency Acoustic Actuation", Sensors and Actuators A 95, pp. 175-182 (2002).

Pedersen, M., et al. "An Integrated Silicon Capacitive Microphone with Frequency-Modulated Digital Output", Sensors and Actuators A 69, pp. 267-275 (1998).

Scheeper, P. R. et al. "Fabrication of Silicon Condenser Microphones Using Single Wafer Technology", J. of Microelectromechanical Systems, vol. 1, No. 3 (1992).

International Search Report for Int'. Patent Application No. PCT/IB2010/052996 (Apr. 29, 2011).

\* cited by examiner

COLLAPSED MODE CAPACITIVE SENSOR

FIELD OF THE INVENTION

The present invention generally relates to devices, methods, and programs of or for capacitive sensing such as electroacoustic transducers, for example ultrasound devices suitable for example for physiological measurement, or pressure sensors, etc.

BACKGROUND OF THE INVENTION

Generally, miniature silicon condenser microphones such as capacitive MEMS, micro-electrical-mechanical system, microphones can be integrated with CMOS circuitry and can be produced by batch processing which makes the device to device variation much smaller. Further, miniature silicon condenser microphones have a form factor compatible with state-of-the-art hand held device architectures, and do not need an electret for electrical biasing which makes them easier to solder onto a printed circuit board, PCB, than conventional electret microphones.

However, it is difficult to achieve high sensitivity and low noise with very small volumes. Further, a conventional silicon capacitive microphone always needs through-wafer etching to create separation of the membrane and back plate layer, which is a time consuming and costly process.

Typically a condenser microphone system may consist of four elements; a fixed, perforated back plate, a highly compliant, moveable membrane or diaphragm (which together form the two plates of a variable air-gap capacitor), a voltage bias source, and a buffer amplifier.

FIG. 1 shows a basic structure of such a capacitive microphone 1 (left) and three possible implementations on a silicon wafer 5 (right). The microphone 1 comprises a diaphragm or membrane 2, a back plate 3, and a back chamber 4. The back chamber 4 illustrated in the left-hand drawing of FIG. 1 may be implemented in the chip-package or on the wafer 5.

The membrane 2 should be highly compliant and precisely positioned relative to the back plate 3, while the back plate should remain stationary and present a minimum of resistance to the flow of air through it. Achieving all of these characteristics in microphones below 1 mm in size using integrated circuit materials is rather challenging. Typical stress levels in integrated circuit thin films, if not relieved in the finished diaphragm or membrane 2, are many times greater than the levels at which the diaphragm becomes unusable due to over-stiffening or buckling. Compliance tends to decrease very rapidly with decreasing size for a given diaphragm material and thickness.

SUMMARY OF THE INVENTION

It is an objective of the presented invention to provide a capacitive sensor with improved functionality.

In accordance with one or more of the embodiments a capacitive sensor is provided for measuring a physical parameter such as sound or pressure. The sensor may comprise a moveable membrane forming an upper electrode, and a bottom layer forming a bottom electrode, wherein the sensor is configured to be driven in a collapsed mode in which the moveable membrane is brought into contact with the bottom layer. The magnitude of the area of contact between the moveable membrane and the bottom layer is configured to depend on the physical parameter to be measured such as the strength and/or frequency of the physical parameter, and an output signal of the sensor depends on the magnitude of the contact area. In accordance with one or more of the embodiments the moveable membrane is partitioned into a plurality of smaller segments, each segment being configured for contact with the bottom layer, the magnitude of the contact areas of each of the smaller segments depending on the value or magnitude of the physical parameter to be measured such as strength and/or frequency of the physical parameter, the output signal of the sensor depending on the total amount of magnitudes of the areas of contact between the or all segments of the moveable membrane and the bottom layer.

In accordance with one or more of the embodiments each segment of the moveable membrane may be formed as an upper part of a blister shaped part surrounding an enclosed volume.

Alternatively, in accordance with one or more of the embodiments the capacitive sensor may comprise supports for supporting the moveable membrane, the segments of the membrane being formed in the sections between the supports.

The moveable membrane may comprise the upper electrode as a conductive layer arranged internally or at the upper or lower outside of the membrane.

In accordance with one or more of the embodiments an electrically insulating layer may be provided between the upper electrode and the bottom electrode. Therefore, galvanic contact between the bottom and upper electrodes can effectively be avoided.

In accordance with one or more of the embodiments the sensor may be an electro-acoustical transducer optionally for measuring sound, or a pressure sensor.

In accordance with one or more of the embodiments a method is provided for fabricating a capacitive sensor for measuring a physical parameter such as sound or pressure. The method comprises the features of generating a bottom layer forming a bottom electrode, generating layer part serving as membrane supports and a sacrificial layer on top of the bottom layer, generating an upper layer serving as a membrane forming an upper electrode, and etching the sacrificial layer between the membrane support so as to provide a plurality of cavities below the membrane serving as membrane segments.

At least some or optionally all embodiments in accordance with the invention achieve high sensitivity and low noise with very small volume. Further, no through-wafer etching is necessary.

Moreover, one or more embodiments provide increased signal to noise ratio and allow a more robust configuration as compared to a MEMS microphone. Further, the fabrication process can be simplified and faster. There is no need for through wafer cavity. Sacrificial layer etching is simpler resulting in higher yield.

In accordance with one or more of the embodiments, the sensitivity for pressure changes is large, providing good pressure measurement. The collapsed mode sensor in accordance with one or more of the embodiments also provides good sensitivity to sound.

Further, stress in the microphone membrane can be avoided, reduced or controlled as a result of the segmentation.

Some or more of the described embodiments relate to a capacitive transducer in the so-called "collapsed mode", and may be used for detecting or measuring sound or pressure. The transducer is improved or optimised by partitioning the moveable element into smaller sections. This partitioning is beneficial for collapsed-mode capacitive sensors.

DETAILED DESCRIPTION OF THE INVENTION

The present invention is further elucidated by the following figures and examples, which are not intended to limit the scope of the invention. The person skilled in the art will understand that various embodiments may be combined.

Figure 1:
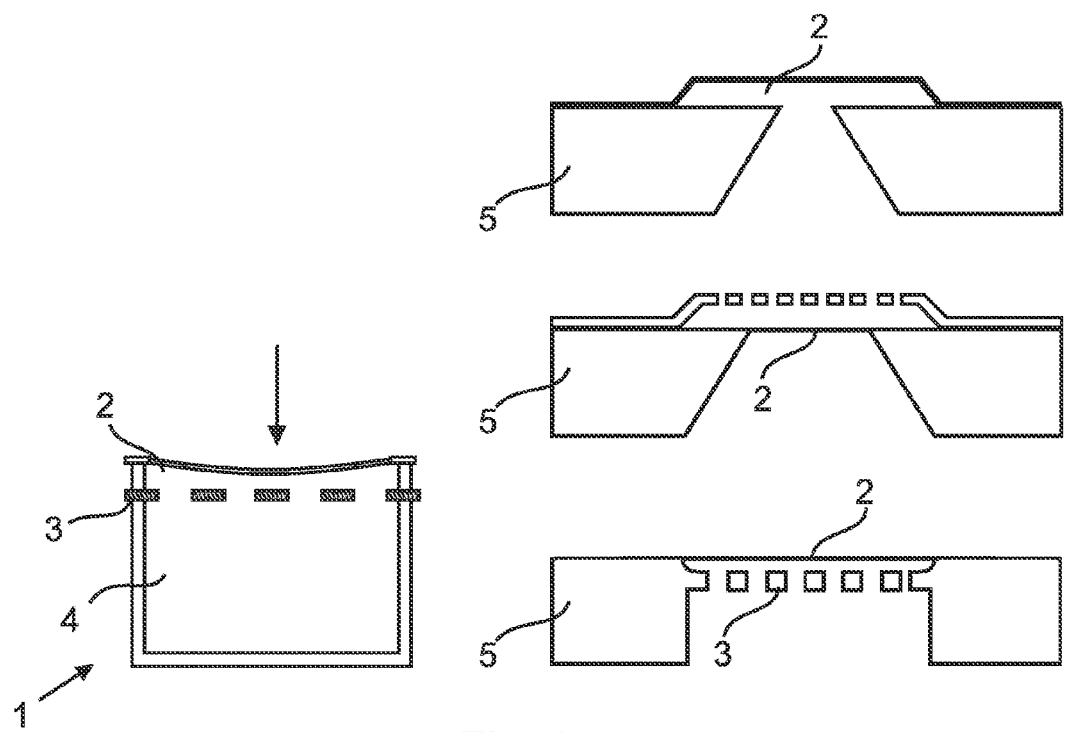
FIG. 1 shows an example embodiment of a basic structure of a capacitive microphone and three possible implementations on a silicon wafer.

It is an objective of the presented invention to provide a capacitive sensor with improved functionality.

In accordance with one or more of the embodiments a capacitive sensor is provided for measuring a physical parameter such as sound or pressure. The sensor may comprise a moveable membrane forming an upper electrode, and a bottom layer forming a bottom electrode, wherein the sensor is configured to be driven in a collapsed mode in which the moveable membrane is brought into contact with the bottom layer. The magnitude of the area of contact between the moveable membrane and the bottom layer is configured to depend on the physical parameter to be measured such as the strength and/or frequency of the physical parameter, and an output signal of the sensor depends on the magnitude of the contact area. In accordance with one or more of the embodiments the moveable membrane is partitioned into a plurality of smaller segments, each segment being configured for contact with the bottom layer, the magnitude of the contact areas of each of the smaller segments depending on the value or magnitude of the physical parameter to be measured such as strength and/or frequency of the physical parameter, the output signal of the sensor depending on the total amount of magnitudes of the areas of contact between the or all segments of the moveable membrane and the bottom layer.

In accordance with one or more of the embodiments each segment of the moveable membrane may be formed as an upper part of a blister shaped part surrounding an enclosed volume.

Alternatively, in accordance with one or more of the embodiments the capacitive sensor may comprise supports for supporting the moveable membrane, the segments of the membrane being formed in the sections between the supports.

The moveable membrane may comprise the upper electrode as a conductive layer arranged internally or at the upper or lower outside of the membrane.

In accordance with one or more of the embodiments an electrically insulating layer may be provided between the upper electrode and the bottom electrode. Therefore, galvanic contact between the bottom and upper electrodes can effectively be avoided.

In accordance with one or more of the embodiments the sensor may be an electro-acoustical transducer optionally for measuring sound, or a pressure sensor.

In accordance with one or more of the embodiments a method is provided for fabricating a capacitive sensor for measuring a physical parameter such as sound or pressure. The method comprises the features of generating a bottom layer forming a bottom electrode, generating layer part serving as membrane supports and a sacrificial layer on top of the bottom layer, generating an upper layer serving as a membrane forming an upper electrode, and etching the sacrificial layer between the membrane support so as to provide a plurality of cavities below the membrane serving as membrane segments.

At least some or optionally all embodiments in accordance with the invention achieve high sensitivity and low noise with very small volume. Further, no through-wafer etching is necessary.

Moreover, one or more embodiments provide increased signal to noise ratio and allow a more robust configuration as compared to a MEMS microphone. Further, the fabrication process can be simplified and faster. There is no need for through wafer cavity. Sacrificial layer etching is simpler resulting in higher yield.

In accordance with one or more of the embodiments, the sensitivity for pressure changes is large, providing good pressure measurement. The collapsed mode sensor in accordance with one or more of the embodiments also provides good sensitivity to sound.

Further, stress in the microphone membrane can be avoided, reduced or controlled as a result of the segmentation.

Some or more of the described embodiments relate to a capacitive transducer in the so-called "collapsed mode", and may be used for detecting or measuring sound or pressure. The transducer is improved or optimised by partitioning the moveable element into smaller sections. This partitioning is beneficial for collapsed-mode capacitive sensors.

DETAILED DESCRIPTION OF THE DRAWINGS

A basic circuit diagram of a capacitive sensor shown in FIG. 1 is described above.

Figure 2:
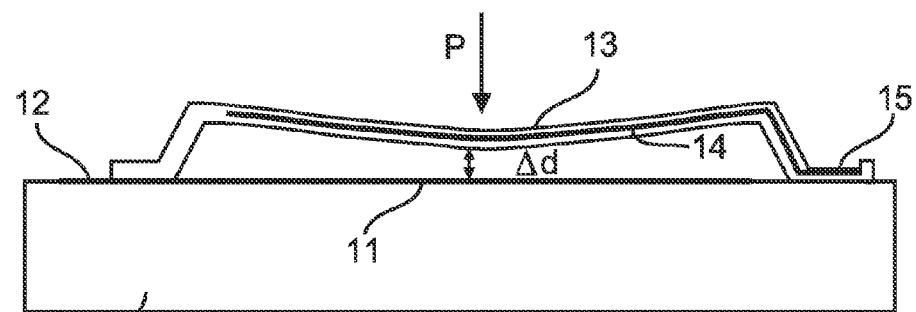
FIG. 2 shows an example embodiment of a normal mode capacitive medical ultrasound transducer.

FIG. 2 schematically shows a capacitive medical ultrasound transducer (CMUT) which comprises a bottom electrode 11 on a silicon wafer 10 extending to a bonding pad or connecting area 12, and a top electrode 14 on or in a closed "blister" shaped closed bridge 13. The top electrode 14 extends along the bridge 13 and down to the wafer 10 to a connecting pad 15.

Figure 3:
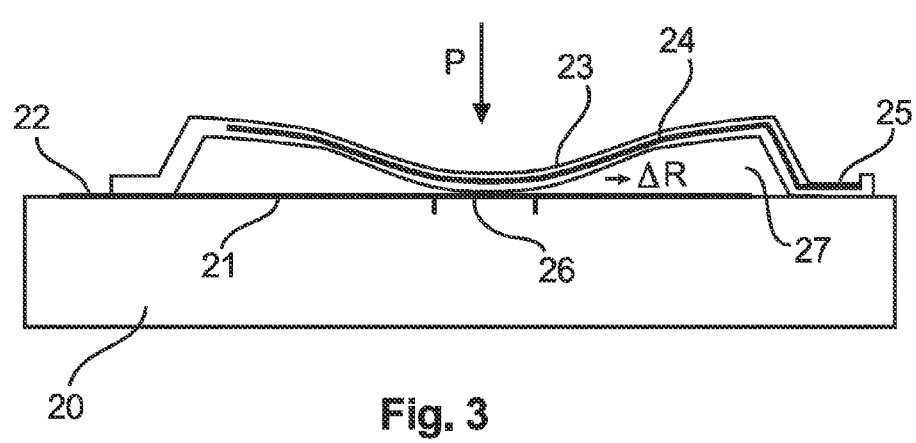
FIG. 3 shows an example embodiment of a collapsed mode capacitive medical ultrasound transducer.

In accordance with one or more of the embodiments, capacitive medical ultrasound transducer, CMUT, devices may be used in "collapsed mode" wherein the membrane is pulled in down to or near to the bottom electrode. This means that either due to a biasing voltage applied between the top and bottom electrodes, or due to the atmospheric pressure (interior is low pressure and closed), the top membrane bends downward, or collapses completely onto the wafer surface, as shown in FIG. 3. The acoustic force or pressure acting on the membrane is symbolized by the arrow P.

The capacitive medical ultrasound transducer (CMUT) schematically shown in FIG. 3 comprises a bottom electrode 21 on a silicon wafer 20 extending to a connecting pad 22 such as a bonding pad for electrical connection of the bottom electrode, and a top electrode 24 on or in a closed "blister" shaped closed bridge 23. The top electrode 24 extends along the bridge 23 and down to the surface of the wafer 20 to a connecting area 25 such as a bonding pad for electrical connection of the top electrode 24. The interior chamber 27 surrounded by the wafer 20 and the bridge 23 is optionally hermetically sealed by means of these components.

FIGS. 2, 3 illustrate the functional difference between a normal mode capacitive transducer (FIG. 2) and a collapsed mode capacitive transducer (FIG. 3).

The functional difference is that in the normal case shown in FIG. 2, which is electrically equal to microphone operation, the change in gap Δd creates the signal. The capacitance of a parallel plate capacitor is equal to $$C = \varepsilon \frac{A}{d} \quad (1)$$

with C the electrical capacitance, A the surface of the capacitor plates, d the gap size and ∈ the dielectric constant of the material in the gap. As a first approximation in normal operation of a CMUT or microphone, the acoustic signal results in a change of d, indicated by Δd.

In the collapsed mode of FIG. 3, the influence of an increase of pressure P is the increase of a contact area 26 of contact between the bottom electrode 21 and the bridge 23 comprising the top electrode internally or externally at the upper or lower side, so an increase of the surface A of the contact area 26. This can be more sensitive than a non-collapsed operation mode because a collapsed mode device works with extremely small gaps "d" resulting into relatively large capacitance changes.

Capacitive medical ultrasound transducers may be operated by applying a direct current (DC) bias voltage less than the collapse voltage of the membrane, so that the membrane is deflected toward the bottom electrode. In the non-collapsed mode, there is no contact between the membrane and the substrate so that the maximum displacement occurs at the center of the membrane. Contrary thereto, in collapse-mode operation, the center of the membrane may always be in contact with the substrate. In the case of a circular membrane, the maximum displacement occurs along the ring formed between the substrate-abutting membrane center and the edge of the membrane. In the collapse-mode operation, a pressure difference may steadily act on the membrane for bringing the membrane into contact with the bottom layer. Alternatively, a direct current bias voltage may be continuously applied. In accordance with one or more embodiments, the applied pressure difference or bias voltage may be initially be increased beyond the collapse pressure difference or voltage and then reduced without releasing the collapsed membrane.

Because the information of a collapsed mode capacitive sensor is in the size of the rim of the collapsed area, an optimised design in accordance with one or more embodiments of the invention consists of an increased rim-length. In one or some embodiments of the invention, the pressure sensor or microphone is split into a number of smaller devices or segments, each with their own collapsed, or incompletely collapsed area. The overall rim-length of all collapsed, or incompletely collapsed areas is thus increased.

In accordance with one or more embodiments, an electrostatic ultrasonic transducer may be formed on a semiconductor substrate by micro-machining. In such an embodiment, the transducer includes a segmented membrane made of silicon nitride or other material. The segments may be supported above the surface of the substrate by insulating supports. The supports may e.g. have the form of rings or separated columns or walls, or may have a honey-comb-like structure with polygonal cross-section. The substrate and membrane define the electrodes of the transducer.

Figure 4:
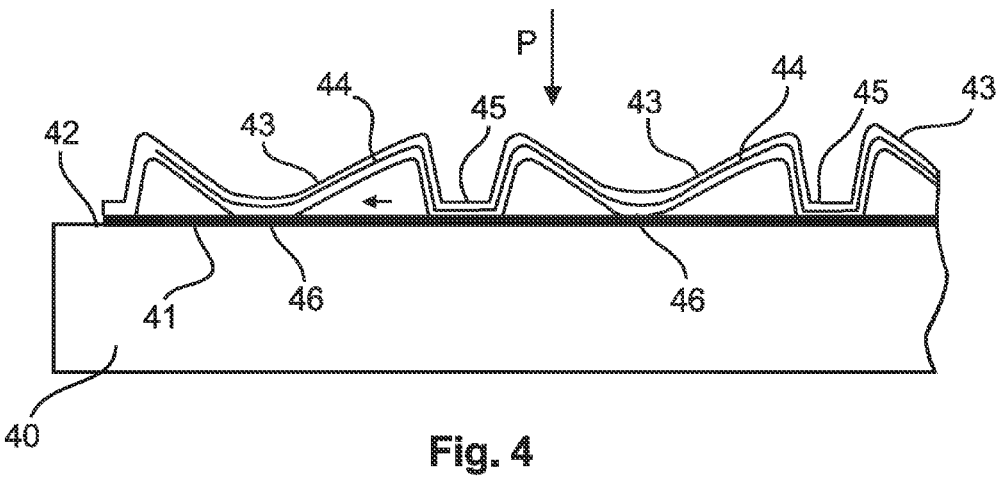
FIG. 4 shows an example embodiment of a capacitive sensor which comprises a segmented membrane having several parts.

FIG. 4 shows an embodiment of a capacitive sensor in accordance with the invention which comprises a segmented membrane having several parts. The embodiment of FIG. 4 is implemented as a capacitive medical ultrasound transducer (CMUT) and has several interconnected blister-shaped parts similar to the embodiment schematically shown in FIG. 3. The embodiment of FIG. 4 comprises a bottom electrode 41 on a silicon wafer 40 extending to a connecting pad 42 such as a bonding pad for electrical connection of the bottom electrode, and several top electrodes 44 on or in closed "blister" shaped bridges 43 each forming a segment of the sensor membrane. FIG. 4 depicts only the left-hand part of the sensor which continues to the right side as illustrated by the curved line shown at the right-hand side of FIG. 4, forming at least two or more laterally arranged interconnected sensor segments. At least in operation, central sections 46 of the bridges 43 are in mechanical contact with or close to the bottom electrode 41. Although there is mechanical contact, the layer stack is arranged such that there is no galvanic contact between the bottom electrode 41 and the top electrodes 44 in order to guarantee the function as a capacitive transducer. As an example, an electrically insulating layer may be applied to the lower side of the top electrodes opposing the bottom electrode, and/or to the upper side of the bottom electrode facing the top electrodes. The top electrodes 44 extend along the bridges 43 above the common bottom electrode 41 and down to electrically interconnecting sections 45 electrically connecting the electrodes 44. The top electrodes 44 are further connected to a connecting area (not shown) such as a bonding pad for electrical connection of the top electrodes 44 to the outside, e.g. in the manner shown in FIG. 3. Interior chambers surrounded by the wafer 40 and the bridges 43 are optionally hermetically sealed by means of these components.

Figure 5:
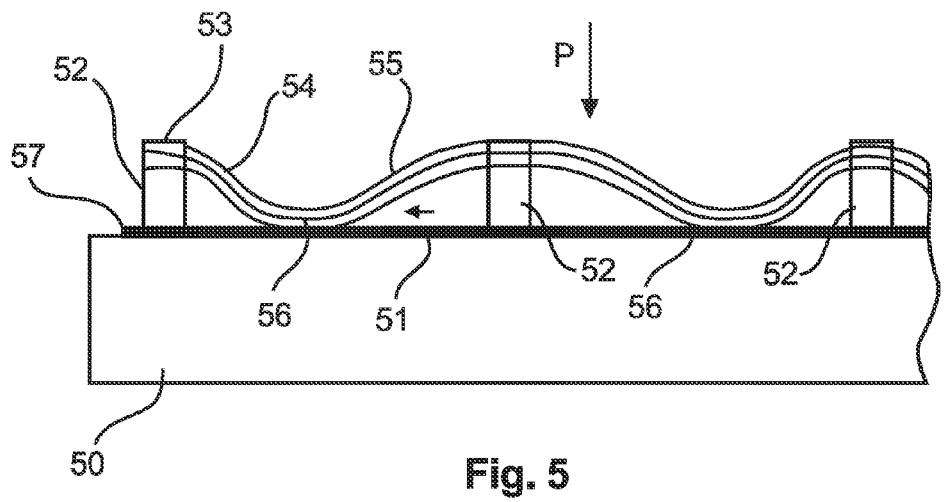
FIG. 5 shows another example embodiment of a capacitive sensor which comprises a segmented membrane having several collapsed parts.

FIG. 5 shows another embodiment of a capacitive sensor in accordance with the invention which comprises a segmented membrane having several collapsed parts. The embodiment of FIG. 5 is implemented as a capacitive medical ultrasound transducer (CMUT) and comprises a top membrane 55 supported on several spaced supports 52 provided optionally at equal height and lateral distances above a common bottom electrode 51. The membrane 55 comprises a top electrode 54 inside or on top or at the bottom of the membrane 55. The embodiment of FIG. 5 comprises the bottom electrode 51 on a silicon wafer 50 extending to a connecting pad 51 such as a bonding pad for electrical connection of the bottom electrode. The parts of the membrane 55 and the top electrode 54 between the supports 52 each form a segment of the collapsible sensor membrane. FIG. 5 depicts only the left-hand part of the sensor which continues to the right side as illustrated by the curved line shown at the right-hand side of FIG. 5, forming at least two or more laterally arranged interconnected sensor segments. At least in operation, parts 56 of the membrane sections between of the supports 52 are in contact with or close to the bottom electrode 51. The top electrode 54 extends to an electrical connection area 53 for contact with a control or measurement section for controlling and/or detecting the electrical power such as voltage and/or current occurring between the top and bottom electrodes 51, 54. Interior chambers surrounded by the wafer 50, the supports 52 and the membrane 55 are optionally hermetically sealed by means of these components. The bottom electrode 51 extends to an electrical connection area 57 for contact with the control and/or measurement section.

Some of the embodiments of the transducer may have dimensions in the 50-200 μm range, and may be used for generating ultrasonic sound bursts.

In an example embodiment the transducer may be excited with its resonance frequency in the 100 kHz-10 MHz range so as to emit the sound. The echoed wave can be sensed by the same device and the time delay and/or extinction may be evaluated as a measure for materials and material topology in the neighbourhood.

Arrays of such devices may be used in medical applications to create beam steering functions. In addition, in common applications the collapsed mode capacitive device may be used as an actuator or sensor, and may e.g. be used in an aqueous environment for optimising the acoustic impedance.

It is beneficial with respect to signal to noise ratio to split a capacitive membrane of a collapsed mode sensor into smaller membrane segments.

Figure 6:
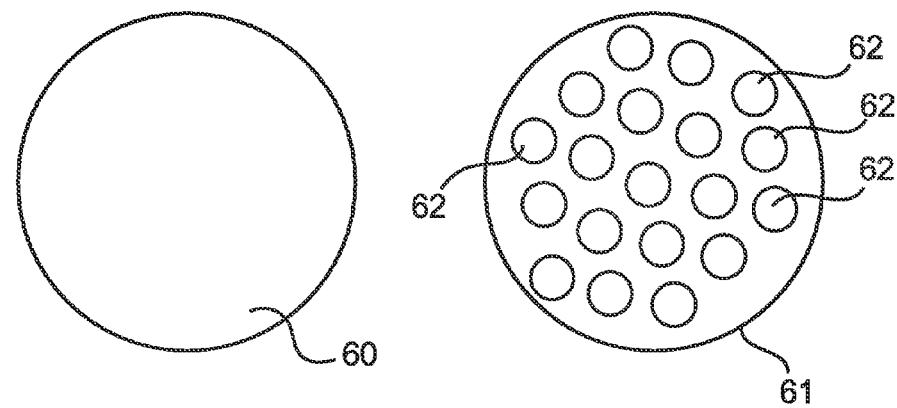
FIG. 6 shows example embodiment top views of a single unsegmented membrane and of a partitioned microphone or pressure sensor segmented into an array of smaller sensors or membrane parts.

FIG. 6 shows top views of a single unsegmented membrane 60 (left side) of a diameter of 1 mm, and of a partitioned microphone or pressure sensor (right side) 61 segmented into an array of smaller sensors or membrane parts 62. In the embodiment of FIG. 6, the membrane 61 has a diameter of e.g. 1 mm and is segmented into e.g. 19 segments 62 having a diameter of e.g. 0, 1 mm arranged at approximately equal distances. The number and distances of the membrane segments may be arbitrarily changed in this or other embodiments.

While a MEMS microphone has a typical size of 500-1000 µm, the transducer or sensor in accordance with one or more of the embodiments such as a microphone may have the same size, but is now partitioned in devices or segments of a typical size of e.g. 50 µm up to 200 µm. As an example the membrane may have, in accordance with one or more of the embodiments, 2 to 50 or 5 to 20 membrane segments. An additional advantage is that the overall resonance frequency can be increased from the tens of kHz range to the hundreds of kHz (or even MHz) range which increases the total harmonic distortion of the device.

The principle of partitioning can be used for any one of the preceding claims kind of capacitive sensors such as electroacoustic transducers e.g. acoustical microphones, and pressure sensors in the low, room and high pressure range, etc.

Embodiments provide increased signal to noise ratio and allow a more robust configuration with respect to a MEMS microphone. Further, the fabrication process is simplified and faster. There is no need for through wafer cavity. Sacrificial layer etching is simpler resulting in higher yield.

Embodiments may be implemented e.g. as microphone devices or pressure sensors or the like. In accordance with one or more of the embodiments, a pressure sensor may be optimised for constant or slowly changing steady state pressures, DC pressures, e.g. in the $10^5$ Pa range, and a microphone may be optimised for alternatingly changing AC-pressures in the µPa-mPa range.

Other variations to the disclosed embodiments can be understood and effected by those skilled in the art in practicing the claimed invention, from a study of the drawings, the disclosure, and the appended claims.

A single unit or devices may fulfill the functions of several items recited in the description or claims. Measures and features mentioned in the description and claims can be arbitrarily combined.

Each of the features recited above or shown in the drawings or disclosed above in separate embodiments or dependent claims may be advantageously combined with two or more of the other features in any arbitrary combination.

While the invention has been illustrated and described in detail in the drawings and foregoing description, such illustration and description are to be considered illustrative or exemplary and not restrictive. The invention is not limited to the disclosed embodiments. For example, it is possible to operate the invention in an embodiment for measuring other signals or parameters.

Other variations to the disclosed embodiments can be understood and effected by those skilled in the art in practicing the claimed invention, from a study of the drawings, the disclosure, and the appended claims. A computer program may be stored or distributed on a suitable medium, such as an optical storage medium or a solid-state medium and may also be distributed in other forms, such as via the Internet or other wired or wireless telecommunication systems.

The measurement processes, steps, and determinations can performed by one or several units or devices. For example, the control and measurement can be performed by a single unit of by any other number of different units. The calculations and determinations and/or the control of the system and/or of the device in accordance with the above described features can be implemented as program code means of a computer program and/or as dedicated hardware.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single . . . or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A capacitive sensor configured to measure a physical parameter, comprising:
   a moveable membrane forming an upper electrode and having a plurality of collapsed parts; and
   a bottom layer forming a bottom electrode, wherein the sensor is configured to be driven in a collapsed mode in which the moveable membrane is brought into contact with the bottom layer, a magnitude of an area of contact between the moveable membrane and the bottom layer being configured to depend on the physical parameter, an output signal of the sensor depending on the magnitude of the contact area,
   wherein each collapsed part being configured for contact with the bottom layer, the magnitude of the contact area of each of the collapsed parts depending on the physical parameter, the output signal of the sensor depending on the total amount of magnitudes of the areas of contact between the collapsed parts of the moveable membrane and the bottom layer.

2. The capacitive sensor according to claim 1, wherein each collapsed part of the moveable membrane is formed as an upper part of a blister shaped part surrounding a closed space.

3. The capacitive sensor according to claim 1, further comprising:
a plurality of supports configured to support the moveable membrane, the collapsed parts of the membrane being formed in the sections between the supports.

4. The capacitive sensor according to claim 1, wherein the moveable membrane comprises the upper electrode as one of a conductive layer arranged internally and at the upper or lower outside of the membrane.

5. The capacitive sensor according to claim 1, further comprising:
an electrically insulating layer provided between the upper electrode and the bottom electrode.

6. The capacitive sensor according to claim 1, wherein the sensor is an electro-acoustical transducer.

7. The capacitive sensor according to claim 1, wherein the sensor is a pressure sensor.

8. Method for fabricating a capacitive sensor configured to measure a physical parameter, comprising:
a moveable membrane forming an upper electrode and having a plurality of collapsed parts; and
a bottom layer forming a bottom electrode, wherein the sensor is configured to be driven in a collapsed mode in which the moveable membrane is brought into contact with the bottom layer, a magnitude of an area of contact between the moveable membrane and the bottom layer being configured to depend on the physical parameter, an output signal of the sensor depending on the magnitude of the contact area,
wherein each collapsed part segment being configured for contact with the bottom layer, the magnitude of the contact area of each of the collapsed parts depending on the physical parameter, the output signal of the sensor depending on the total amount of magnitudes of the areas of contact between the collapsed parts of the moveable membrane and the bottom layer,
said method comprising generating a bottom layer forming a bottom electrode, generating a layer part serving as a plurality of membrane supports and a sacrificial layer on top of the bottom layer, generating an upper layer serving as a membrane forming an upper electrode, and etching the sacrificial layer between the membrane support so as to provide a plurality of cavities below the membrane serving as membrane segments.

9. A method of fabricating a capacitive sensor as in claim 8 which is fabricated using thin-film silicon processing techniques.

* * * * *